United States Patent
Riley

[11] 3,858,963
[45] Jan. 7, 1975

[54] TRANSVERSE MODE SELECTION IN LASERS FOR HOLOGRAPHY

[75] Inventor: Lance W. Riley, Burbank, Calif.

[73] Assignee: Apollo Lasers Inc., Los Angeles, Calif.

[22] Filed: Mar. 20, 1974

[21] Appl. No.: 452,951

[52] U.S. Cl. .............................. 350/3.5, 331/94.5 C
[51] Int. Cl. ............................................ G02b 27/00
[58] Field of Search ...................... 350/3.5, 162 SF; 331/94.5 C

[56] References Cited
UNITED STATES PATENTS

| | | | |
|---|---|---|---|
| 3,533,674 | 10/1970 | Brooks et al. | 350/3.5 |
| 3,577,094 | 5/1971 | Tomlinson et al. | 331/94.5 |
| 3,580,655 | 5/1971 | Leith et al. | 350/3.5 |
| 3,736,040 | 5/1973 | Zivi et al. | 350/3.5 |

Primary Examiner—Ronald J. Stern
Attorney, Agent, or Firm—Fulwider, Patton, Rieber, Lee & Utecht

[57] ABSTRACT

A generally annular mode selector is located in a laser cavity and allows lasing in a uniphase or fundamental transverse mode through an aperture in the mode selector, as well as in higher-order transverse modes around the periphery of the mode selector. Light energy emitted from the laser cavity is split in a conventional manner into a reference beam and an object beam for use in a holographic recording system. The reference beam is passed through a second aperture to obtain a purely uniphase reference source, and the object beam, comprising both fundamental and multimode components, is utilized to provide high-energy illumination of an object of which a hologram is to be made.

13 Claims, 3 Drawing Figures

TRANSVERSE MODE SELECTION IN LASERS FOR HOLOGRAPHY

BACKGROUND OF THE INVENTION

This invention relates generally to transverse electromagnetic (TEM) mode selection in lasers, and more particularly, to an improved method and apparatus for mode selection in pulsed lasers utilized in holography.

In a widely used holographic recording technique, two laser beams are used to make a hologram: a reference beam and an object beam. The reference beam is directed at a photographic recording plate, and the object beam illuminates an object whose image is to be recorded. In the case of a diffusely reflecting, opaque object, the object beam is reflected from the object and interferes with the reference beam to produce the hologram on the photographic recording plate. Subsequently, if the recorded hologram is exposed to a reference beam, an exact replica of the reflected object beam is produced by a process of diffraction, and a three-dimensional image of the object is thereby created.

The reference beam must be not only monochromatic, but must have a so-called uniphase character, i.e., its phase must be constant over a flat wavefront. The reference beam is normally derived from a laser limited to operate in a fundamental or $TEM_{00}$ mode. The object beam, on the other hand, need not have a uniphase character and is usually scrambled in phase by the interposition of a diffuser before the beam reaches the object.

Most lasers, and especially pulsed lasers, produce output which is a mixture of different transverse modes. The $TEM_{00}$ mode can be selected by including in the laser cavity an opaque sheet having a small aperture aligned with the optical axis of the laser. The aperture permits lasing only in a region close to the optical axis, and limits the laser primarily to operation in the $TEM_{00}$ mode.

Typically, for reasons of economy and simplicity, only one laser is used to provide both the reference and object beams. The laser is aperture-limited to operate primarily in the $TEM_{00}$ mode, and the laser output is split into two portions to provide the reference and object beams. In this arrangement, however, a large proportion of the total available laser energy is not utilized, since the higher-order transverse modes are suppressed by use of the aperture.

It will be appreciated from the foregoing that there is a definite need for a transverse mode selector which provides a uniphase or $TEM_{00}$ mode output to serve as a reference beam, without wasting all of the available laser energy produced at higher-order transverse modes of operation. The present invention fulfills this need.

SUMMARY OF THE INVENTION

The present invention resides in a method and apparatus for producing output from a pulsed laser in a particular lasing mode, such as uniphase or $TEM_{00}$ for use as a holographic reference beam, and simultaneously utilizing the normally wasted, higher-order or multimode output of the laser in an object beam.

Briefly, and in general terms, the apparatus of the invention includes an opaque mode selector having an aperture small enough to allow lasing only in a particular mode, and having an outside dimension selected to allow multimode lasing around the mode selector without interference with lasing through the aperture. Also included is a conventional beam splitter to separate the reference and object beams, and a conventional aperture in the reference beam to allow only a uniphase light to pass. The resulting object beam includes not only a portion of the uniphase energy, but also a relatively large proportion of the multimode energy usually wasted or suppressed in prior systems.

More particularly, the mode selector in a presently preferred embodiment of the invention is annular in shape and may be separately mounted in the laser cavity, or may be inscribed as an annular pattern on any of a number of optical surfaces associated with the laser.

According to the method of the present invention, a reference beam and an object beam are produced by limiting a laser to operate in the uniphase mode through an aperture in a mode selector in the laser cavity, and in higher-order modes around the mode selector; splitting the resultant uniphase and multimode energy into a reference beam and an object beam; and limiting the reference beam to uniphase mode energy only, by means of a conventional aperture.

It will be apparent from the foregoing that the present invention may be used in a holographic recording system to provide a uniphase reference beam and an object beam which utilizes much more available output energy from the laser than prior systems of this general type. This large increase in output energy greatly broadens the field of application of pulsed-laser holographic systems. Other aspects an advantages of the invention will become apparent from the following more detailed description taken in conjunction with the accompanying drawings.

DETAILED DESCRIPTION

Figure 1:
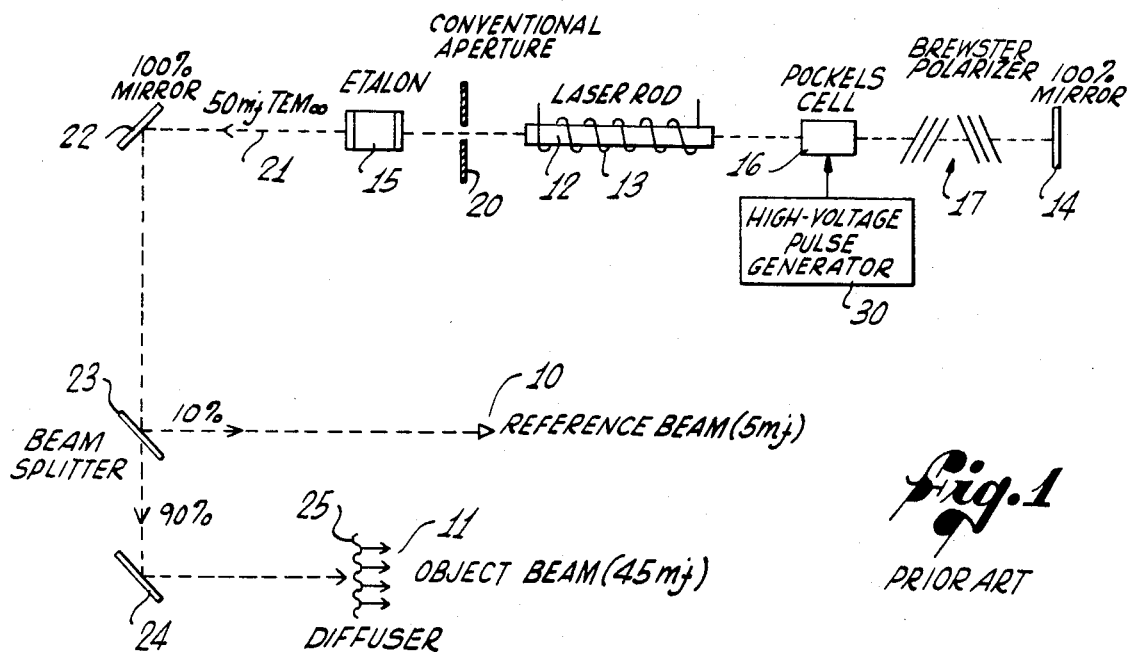
FIG. 1 is a diagrammatic view of portion of a prior art holographic recording system, showing how the refernce and object beams are derived from a single pulsed laser.

As shown in the drawings for purposes of illustration, the present invention relates to an improved technique for deriving a reference beam and a high-energy object beam from a pulsed laser in a holographic recording system. FIG. 1 diagrammatically illustrates a typical prior art system for deriving a reference beam 10 and an object beam 11. Usually, the object beam 11 is used to illuminate an object (not shown) of which a hologram is to be made. The object beam 11 is diffusely reflected from the object and interferes with the reference beam 10, which must be coherent light in the so-called uniphase mode. A recording plate (not shown) is located both in the path of the reference beam 10 and in the path of the light reflected from the object. The plate records the resulting interference pattern, usually photographically, and a permanent hologram is obtained from which a three-dimensional image of the object may be subsequently reconstructed.

The illustrative prior art system includes a solid state laser rod 12, such as a ruby rod, with the usual helical flash-tube shown diagrammatically at 13, a totally reflecting mirror 14, an etalon 15, and a "Q-switching" arrangement including a Pockels cell 16 and a Brewster polarizer 17, all arranged along the optical axis of the laser rod 12. The etalong 15 is a relatively short resonant cavity which refines the axial mode of the laser output and also functions as an output mirror.

As is well known in the laser art, Q-switching is a technique for obtaining a high-energy, short-duration, output pulse from a laser. The specific Q-switching means used in the illustrative prior art system, as well as in an improved system to be described, will be subsequently discussed in more detail.

In the prior art system, a conventional aperture 20 is located in the laser cavity, i.e., in the space between the etalon 15 and the totally reflecting mirror 14, to limit lasing in the cavity to so-called fundamental transverse electomagnetic mode, otherwise known as the $TEM_{00}$ mode. A pulse of light energy output along the line 21 is reflected by a second totally reflecting mirror 22, and is split in the ratio 10:90 by a beam splitter 23. The 10 percent portion is used as the reference beam 10, and the 90 percent portion is reflected by a third totally reflecting mirror 24, and diffused by a diffuser 25 before being used as the object beam 11.

Typically, if the laser rod 12 is a ruby rod, it has a diameter of about five-eights inch diameter and the total energy in the pulse emitted along the line 21 is approximately 50 millijoules (mj). Thus, the energy in the reference beam is approximately 5 mj and the energy in the object beam is approximately 45 mj. The laser is, of course, capable of producing a total output much higher than 50 mj, but the higher-order transverse modes of operation are suppressed by the conventional aperture 20, and the energy associated with this multimode lasing is effectively wasted.

Figure 2:
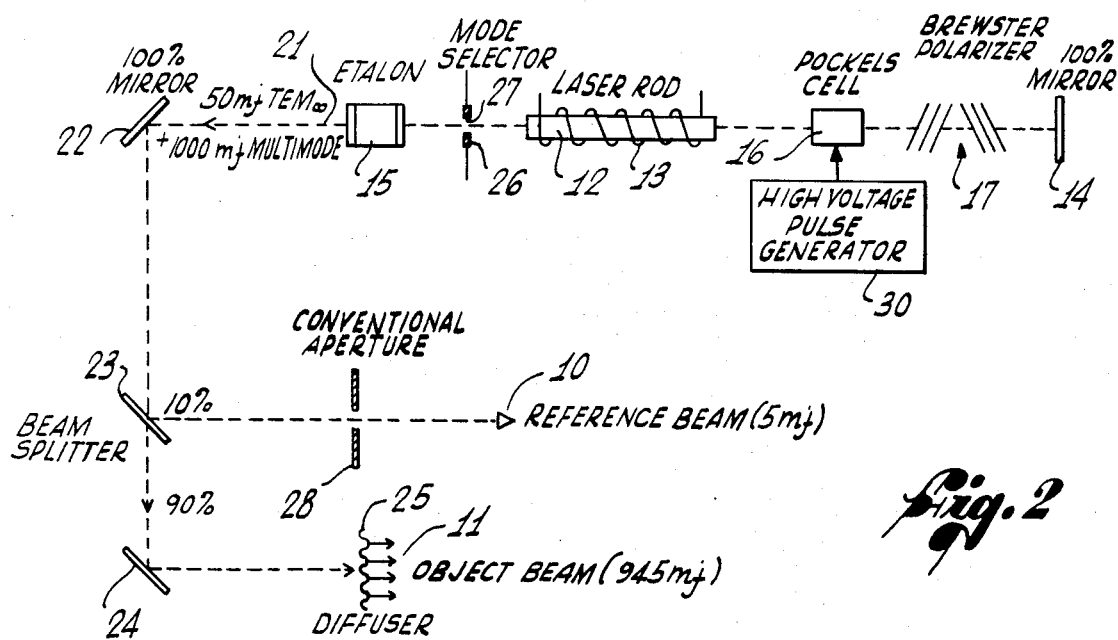
FIG. 2 is a diagrammatic view similar to FIG. 1, showing how the reference and object beams are derived in accordance with the present invention.

In accordance with the present invention, a special mode selector 26 (see FIG. 2), rather than the conventional aperture 20, is positioned in the laser cavity and operates to allow lasing around its periphery in higher-order transverse modes, as well as in the $TEM_{00}$ mode through a central aperture 27. Thus, a substantial portion of the multimode energy suppressed by the conventional aperture 20 (FIG. 1) is emitted as output along line 21 in the improved system illustrated in FIG. 2. This multimode energy may be utilized in the object beam 11, since there is no requirement for the object beam to be uniphase in character.

The output pulse is split in the ratio 10:90, as in the illustrative prior art system, and the reference beam 10 is derived by passing the 10 percent portion through a conventional aperture 28 so that only energy in the $TEM_{00}$ mode passes into the reference beam. the 90 percent portion of the output is, as in the prior art system, passed through the diffuser 25 and is used as the object beam 11, but the energy of the object beam in this improved system may be 20 or more times the energy of the prior art object beam.

Figure 3:
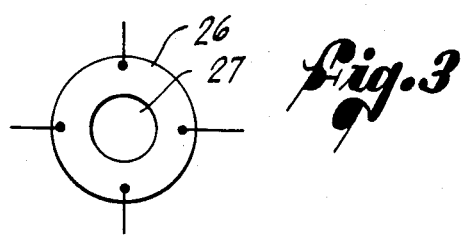
FIG. 3 is an enlarged plan view of the mode selector of the present invention, as viewed along the optical axis of the laser.

More specifically, the mode selector 26 is preferably annular in cross-section, as shown in FIG. 3. The diameter of its aperture 27 in a presently preferred embodiment is approximately 0.080 inch, for the typical five-eighth inch-diameter ruby rod 12 mentioned above, and the outside diameter is approxiimately 0.200 inch, although the dimensions are not critical. The only requirements to be satisfied are that the aperture 27 be small enough to allow only $TEM_{00}$ mode lasing, and that the outside diameter be large enough to prevent the multimode output from diffracting into or interfering with the central $TEM_{00}$ output, yet not so large as to suppress all multimode output.

With these suggested dimensions, the multimode output is approximately one joule (1,000 mj), in addition to the $TEM_{00}$ output of approximately 50 mj. Thus the reference beam energy is 5 mj, i.e., 10 percent of 50 mj, and the object beam energy is 945 mj (90 percent of 1,050 mj), or 20 times the energy of the prior art object beam.

The mode selector 26 may be a separate thin plate, as shown, of any convenient material opaque to light, and may be suspended in the laser cavity by supporting wires 30 (FIG. 3). Alternatively, the mode selector 26 may be etched or inscribed on one of the optical surfaces associated with the laser rod 12, such as on one end of the rod itself, or on one surface of the etalon 15.

As mentioned earlier, Q-switching in the illustrative prior art system and in the improved system, is accomplished in a conventional manner. The Brewster polarizer 17 and the laser rod 12, which itself acts as a polarizer, form a pair of crossed polarizers. These effectively prevent the transmission of light through the two of them in combination, as long as the Pockels cell 16 has no effect on light transmitted therethrough. When a pulse of an appropriate voltage, known as the half-wave voltage, is applied to the Pockels cell 16 from a high-voltage pulse generator 30, the plane of polarization of light passing through the cell is effectively rotated by 90° by an electro-optical effect, and the laser cavity is switched momentarily to a high-Q condition, initiating the formation of a high-energy laser pulse.

It will be apparent from the foregoing description that the present invention represents a significant advance in the field of pulsed-laser holography. In particular, it provides an object beam of considerably greater output energy than in prior systems, and does so without any upgrading of the laser energy source. Although described herein for use with a pulsed ruby laser, the invention may be used with all pulsed lasers utilized for holography, such as pulsed dye lasers, and frequency doubled neodymium/glass or neodymium/yttrium aluminum garnet lasers. The invention is likewise usable with double- and multi-pulsed lasers as well as with single-pulsed lasers.

While the presently preferred embodiment of the invention has been disclosed specifically in connection with its application to a holographic recording technique, it will be appreciated that the invention may be used in other applications where there is a requirement for one beam in the fundamental mode and another not necessarily in the fundamental mode. These applications will usually, although not necessarily, involve some aspect of interferometry.

It will also be appreciated that, although a particular embodiment of the invention has been described in detail for purposes of illustration, various modifications may be made witout departing from the spirit and scope of the invention. Accordingly, the invention is not to be limited except as by the appended claims.

I claim:

1. For use in an interferometric technique utilizing a laser for producing light output generally along an optical axis, transverse mode selection means, comprising:

a first opaque mode selector disposed within the laser and along the optical axis of the laser, said mode selector having an aperture at the axis small enough to allow lasing only in a uniphase mode, and having an outer dimension selected to allow multimode lasing around said first mode selector without interference with the uniphase lasing through said aperture;

beam splitting means for dividing the laser output from said first mode selector into a first beam and a second beam; and a second opaque mode selector located in the path of said first beam and having an aperture small enough to pass energy only in the uniphase mode and an outer dimension large enough to prevent transmission of multimode energy;

whereby said first beam is limited to contain only uniphase energy, and said second beam utilizes both uniphase and multimode output from the laser to provide a high-energy source.

2. A mode selection means as set forth in claim 1, wherein said first mode selector is annular in shape.

3. A mode selection means as set forth in claim 2, wherein said first mode selector comprises a generally flat plate suspended in a position substantially normal to the optical axis.

4. A mode selection means as set forth in claim 2, wherein said first mode selector comprises an inscribed pattern on an optical surface associated with the laser.

5. A mode selection means as set forth in claim 1, further including diffusing means located in said second beam for producing a diffuse object beam.

6. A mode seletion means as set forth in claim 1, wherein said beam splitting means in designed such that said second beam contains substantially more energy than said first beam, and whereby said second beam contains a substantial proportion of available output from the laser.

7. A pulsed laser holographic recording system including a pulsed laser producing light output from a laser cavity, and beam splitting means for dividing the laser light output into an object beam used to illuminate an object of which a hologram is to be made, and a reference beam of substantially less energy than said object beam, used to interfere with light from the object to produce the hologram, wherein the improvement comprises:

an opaque annular mode selector located in the laser cavity, said selector having an aperture small enough to permit lasing therethrough only in a fundamental or $TEM_{00}$ mode, and having an outside diameter selected to permit lasing around said mode selector in higher-order transverse modes without interference with the fundamental mode lasing through said aperture; and an opaque screen located in the reference beam and having an aperture therethrough to allow the transmission of only fundamental mode enegy in the reference beam;

whereby a large proportion of the available multimode output from the laser is utilized in the object beam.

8. A pulsed laser holographic recording system as set forth in claim 7, wherein said mode selector comprises a plate suspended in the laser cavity.

9. A pulsed laser holographic recording system as set forth in claim 7, wherein said mode selector comprises an inscribed pattern on an optical surface within the laser cavity.

10. A pulsed laser holographic recording system as set forth in claim 7, further including diffusing means located in said object beam, for providing diffuse illumination for the object.

11. A method for deriving from a laser a uniphase reference beam for use in holographic recording, and a high-energy object beam to illuminate an object of which a hologram may be made, including the steps of:

limiting the laser to operate in a fundamental transverse mode through an aperture in a mode selection means;

simultaneously allowing the laser to operate in higher-order transverse modes aroung the periphery of the mode selection means without interference with the fundamental mode;

splitting output energy from the laser into an object beam and a reference beam; and limiting the reference beam to the fundamental transverse mode by passing it through an additional aperture;

whereby a substantial portion of the higher-order transverse mode energy is utilized in the high-energy object beam.

12. A method as set forth in claim 11, further including the step of diffusing the object before allowing it to illuminate the object.

13. A method as set forth in claim 12, wherein said steps of limiting the laser to operate in a fundamental transverse mode and simultaneously allowing the laser to operate in higher-order transverse modes are effected by limiting light in the laser to pass through and around an annular pattern inscribed on an optical surface of the laser.

* * * * *